US009431007B2

(12) United States Patent
Tomita

(10) Patent No.: US 9,431,007 B2
(45) Date of Patent: Aug. 30, 2016

(54) VOICE SEARCH DEVICE, VOICE SEARCH METHOD, AND NON-TRANSITORY RECORDING MEDIUM

(71) Applicant: CASIO COMPUTER CO., LTD., Shibuya-ku, Tokyo (JP)

(72) Inventor: Hiroki Tomita, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 14/597,958

(22) Filed: Jan. 15, 2015

(65) Prior Publication Data

US 2015/0255060 A1    Sep. 10, 2015

(30) Foreign Application Priority Data

Mar. 5, 2014   (JP) .................... 2014-042541

(51) Int. Cl.
| | |
|---|---|
| G10L 15/00 | (2013.01) |
| G10L 15/14 | (2006.01) |
| G10L 15/02 | (2006.01) |
| G10L 15/18 | (2013.01) |
| G06F 17/30 | (2006.01) |
| G10L 25/87 | (2013.01) |
| G10L 25/54 | (2013.01) |
| G10L 15/08 | (2006.01) |

(52) U.S. Cl.
CPC ....... *G10L 15/142* (2013.01); *G06F 17/30755* (2013.01); *G06F 17/30967* (2013.01); *G10L 15/02* (2013.01); *G10L 15/18* (2013.01); *G10L 25/54* (2013.01); *G10L 25/87* (2013.01); *G10L 2015/025* (2013.01); *G10L 2015/081* (2013.01); *G10L 2015/088* (2013.01)

(58) Field of Classification Search
USPC .................... 704/231–257, 270–275
See application file for complete search history.

(56) References Cited

U.S. PATENT DOCUMENTS

| | | | | |
|---|---|---|---|---|
| 6,535,850 | B1* | 3/2003 | Bayya | G10L 15/07 704/239 |
| 6,662,180 | B1* | 12/2003 | Aref | G06F 17/30625 |
| 6,873,993 | B2* | 3/2005 | Charlesworth | G06F 17/30017 704/251 |

(Continued)

OTHER PUBLICATIONS

Keisuke Iwami, et al, "Strict Distance Measure for a Spoken Term Detection Method Based on a Syllable n-gram Index with Distance Metric", IPSJ Journal, vol. 54, No. 2, pp. 495-505, 2013

(Continued)

*Primary Examiner* — Jesse Pullias
(74) *Attorney, Agent, or Firm* — Holtz, Holtz & Volek PC

(57) ABSTRACT

In a voice search device, a processor acquires a search word, converts the search word into a phoneme sequence, acquires, for each frame, an output probability of a feature quantity of a target voice signal being output from each phoneme included in the phoneme sequence, and executes relative calculation of the output probability acquired from each phoneme, based on an output probability acquired from another phoneme included in the phoneme sequence. In addition, the processor successively designates likelihood acquisition zones, acquires a likelihood indicating how likely a designated likelihood acquisition zone is a zone in which voice corresponding to the search word is spoken, and identifies from the target voice signal an estimated zone for which the voice corresponding to the search word is estimated to be spoken, based on the acquired likelihood.

21 Claims, 13 Drawing Sheets

(56) References Cited

U.S. PATENT DOCUMENTS

| | | | | |
|---|---|---|---|---|
| 7,904,296 B2* | 3/2011 | Morris | ............... | G10L 15/04 704/231 |
| 7,983,915 B2* | 7/2011 | Knight | ............. | G06F 17/30026 704/254 |
| 2007/0033003 A1* | 2/2007 | Morris | ............... | G10L 15/04 704/9 |

OTHER PUBLICATIONS

Related U.S. Appl. No. 14/604,345, First Named Inventor: Hiroyasu Ide, filed Jan. 23, 2015, Title: "Voice Search Device, Voice Search Method, and Non-Transitory Recording Medium".

Yaodong Zhang, et al., "An Inner-Product Lower-Bound Estimate for Dynamic Timewarping", ICASSP 2011, pp. 5660-5663.

* cited by examiner

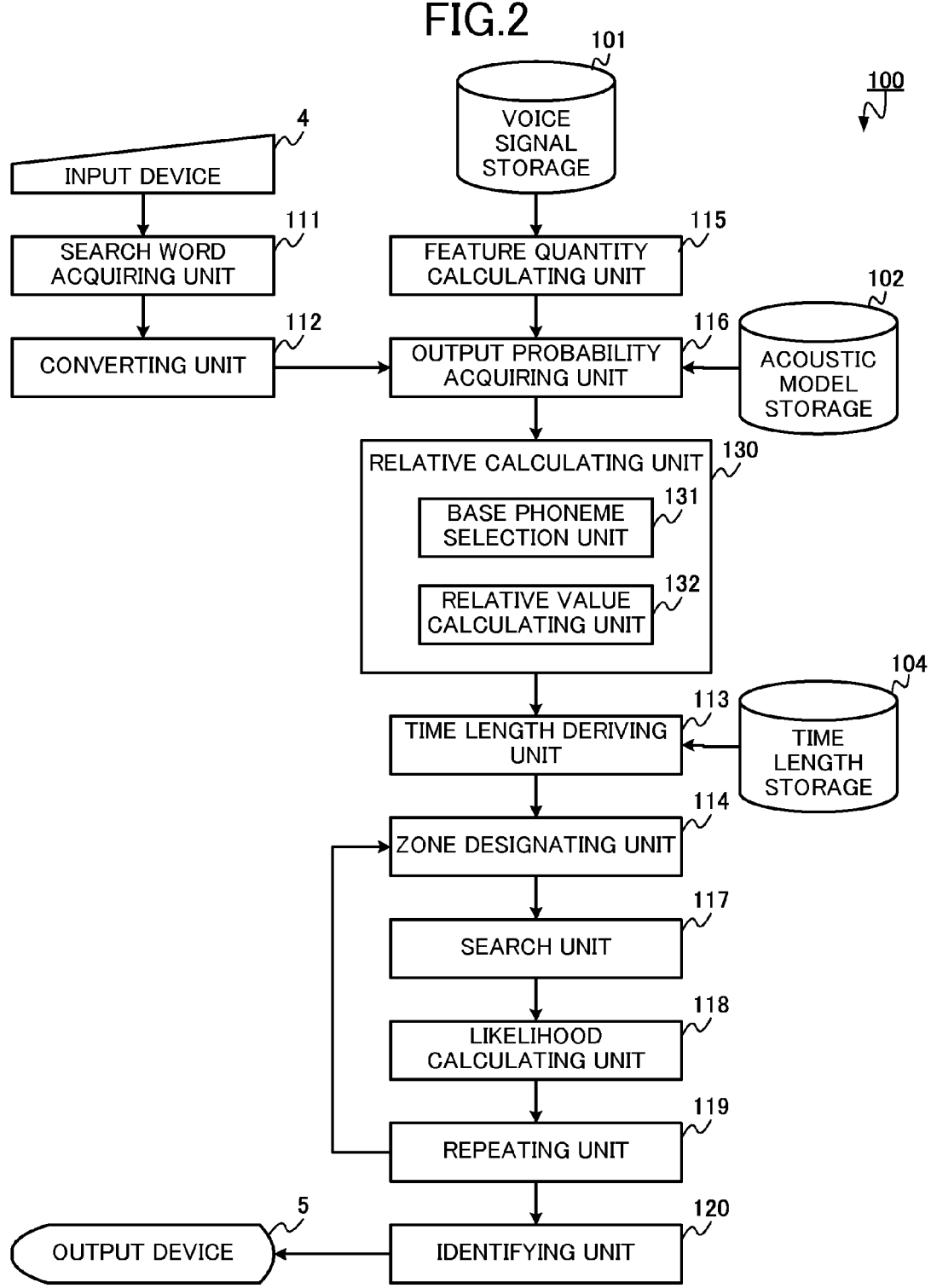

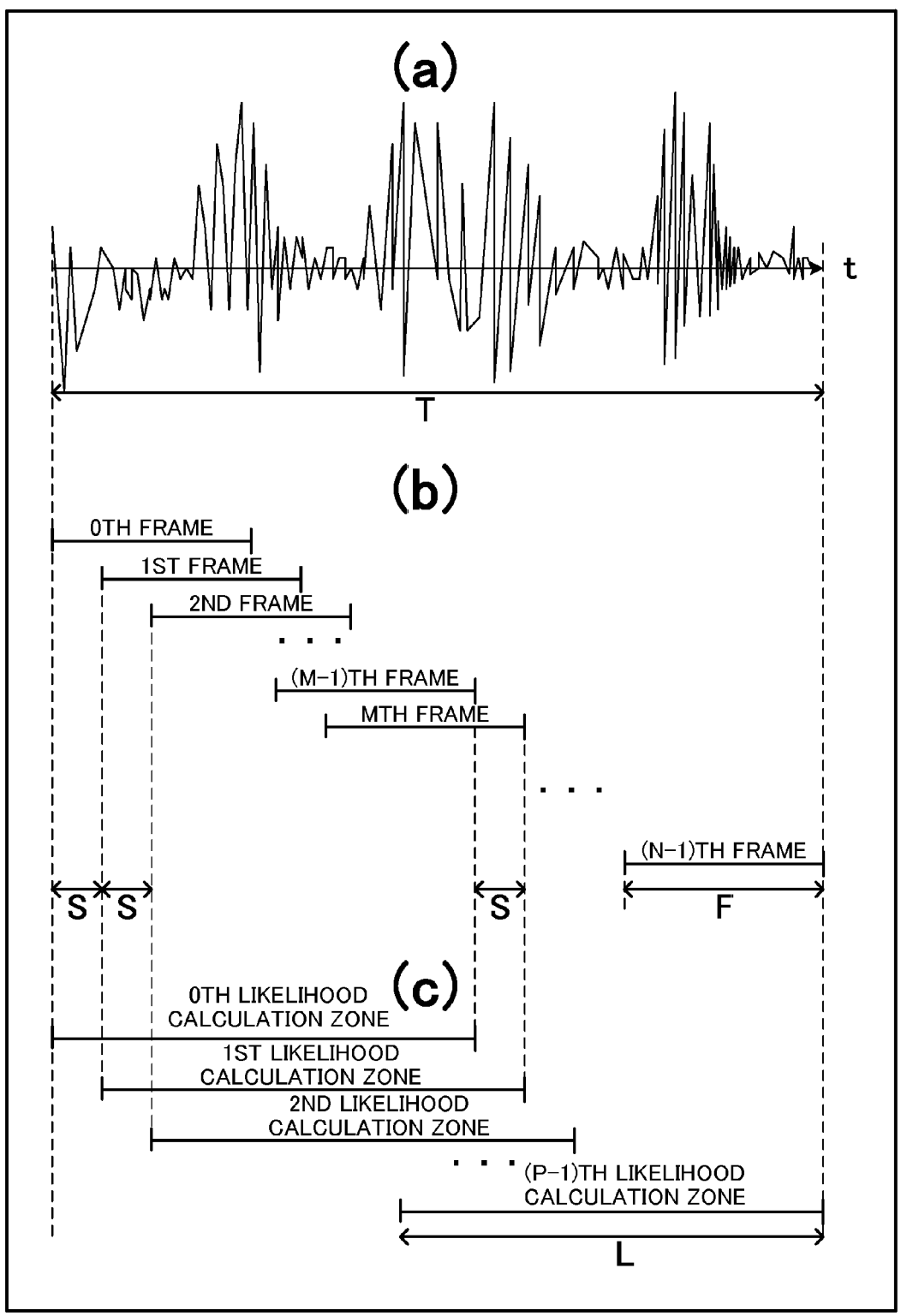

FIG.4A

| | r | a: | m | e | N | sil |
|---|---|---|---|---|---|---|
| 0 | 0.1 | 0.2 | 0.15 | 0.25 | 0.15 | 0.15 |
| 1 | 0.4 | 0.3 | 0.2 | 0.4 | 0.3 | 0.5 |
| 2 | 0.15 | 0.3 | 0.2 | 0.2 | 0.25 | 0.2 |
| 3 | 0.15 | 0.2 | 0.2 | 0.2 | 0.15 | 0.1 |
| ⋮ | | | ⋮ | | ⋮ | |

FRAME ↓

FIG.4B

| | r | a: | m | e | N | sil | BASE PHONEME |
|---|---|---|---|---|---|---|---|
| 0 | 0.1 | 0.2 | 0.15 | 0.25 | 0.15 | 0.15 | r |
| 1 | 0.4 | 0.3 | 0.2 | 0.4 | 0.3 | 0.5 | m |
| 2 | 0.15 | 0.3 | 0.2 | 0.2 | 0.25 | 0.2 | r |
| 3 | 0.15 | 0.2 | 0.2 | 0.2 | 0.15 | 0.1 | sil |
| ⋮ | | | ⋮ | | ⋮ | | ⋮ |

FRAME ↓

FIG.4C

| | r | a: | m | e | N | sil | BASE PHONEME |
|---|---|---|---|---|---|---|---|
| 0 | 1 | 2 | 1.5 | 2.5 | 1.5 | 1.5 | r |
| 1 | 2 | 1.5 | 1 | 2 | 1.5 | 2.5 | m |
| 2 | 1 | 2 | 1.33 | 1.33 | 1.67 | 1.33 | r |
| 3 | 1.5 | 2 | 2 | 2 | 1.5 | 1 | sil |
| ⋮ | | | ⋮ | | ⋮ | | ⋮ |

FRAME ↓

FIG.9

| FRAME | | r | a: | m | e | N | CUMULATIVE DISTANCE | TRANSITION DIRECTION |
|---|---|---|---|---|---|---|---|---|
| | 0 | 4 | | | | | 4 | ↓ |
| | 1 | 5 | | | | | 9 | ↓ |
| | 2 | 3 | | | | | 12 | → |
| | 3 | | 3 | | | | 15 | ↓ |
| | 4 | | 6 | | | | 21 | ↓ |
| | 5 | | 1 | | | | 22 | → |
| | 6 | | | 8 | | | 30 | ↓ |
| | 7 | | | 2 | | | 32 | → |
| | 8 | | | | 3 | | 35 | → |
| | 9 | | | | | 7 | 42 | ↓ |
| | 10 | | | | | 5 | 47 | |

CUMULATIVE DISTANCE NORMALIZED OVER ENTIRE PATH :
3.45 = ( 6 + 2 + 2 + 2 + 3 + 3 + 1 + 2 + 7 + 4 + 6 ) / 11

CUMULATIVE DISTANCE NORMALIZED FOR EACH PHONEME :
25.1 = 6 / 1 + ( 2 + 2 + 2 + 3 + 3 + 1 + 2 ) / 7 + 7 / 1 + 4 / 1 + 6 / 1

CUMULATIVE DISTANCE NORMALIZED OVER ENTIRE PATH :
3.54 = ( 4 + 4 + 3 + 3 + 3 + 3 + 4 + 3 + 3 + 4 + 5 ) / 11

CUMULATIVE DISTANCE NORMALIZED FOR EACH PHONEME :
18.5 = ( 4 + 4 ) / 1 + ( 3 + 3 + 3 + 3 ) / 4 + 4 / 1 + ( 3 + 3 ) / 2 + ( 4 + 5 ) / 2

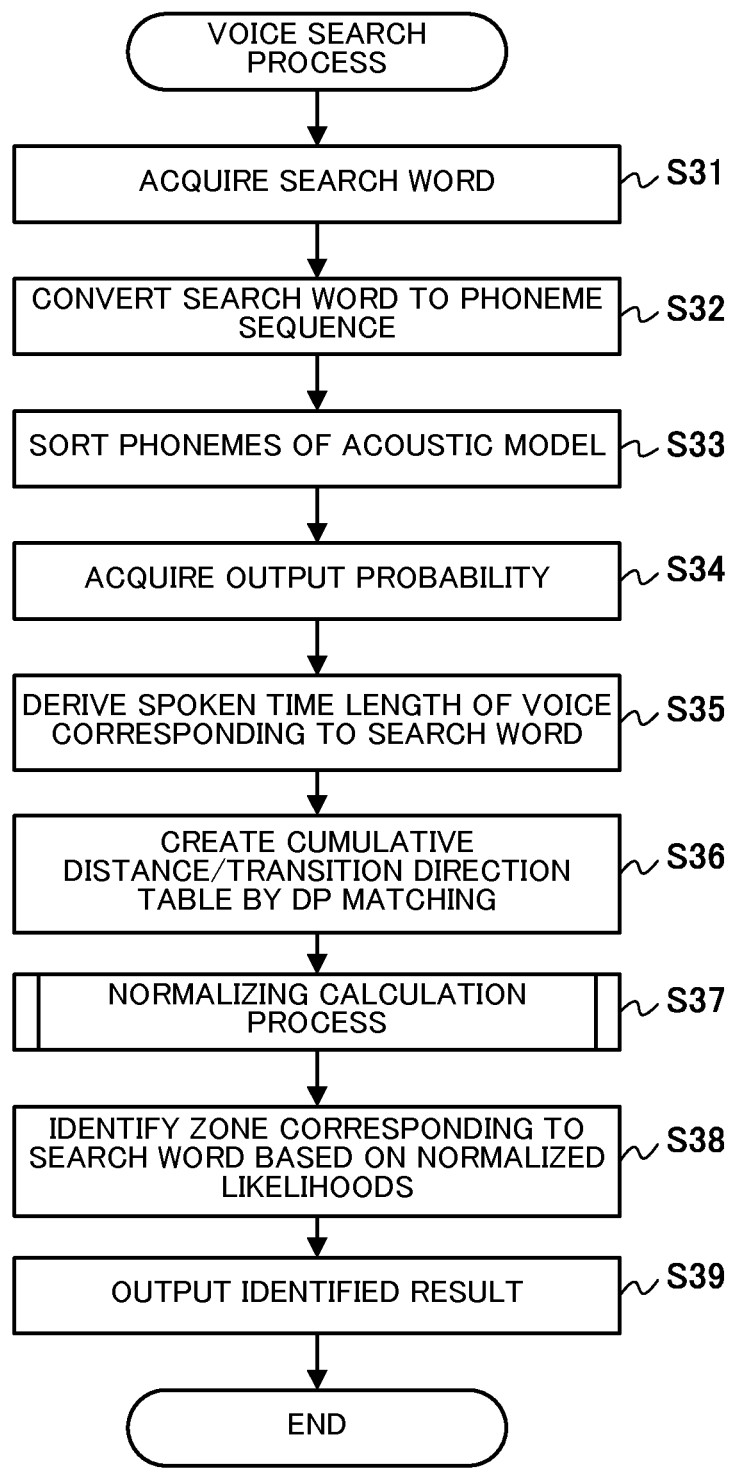

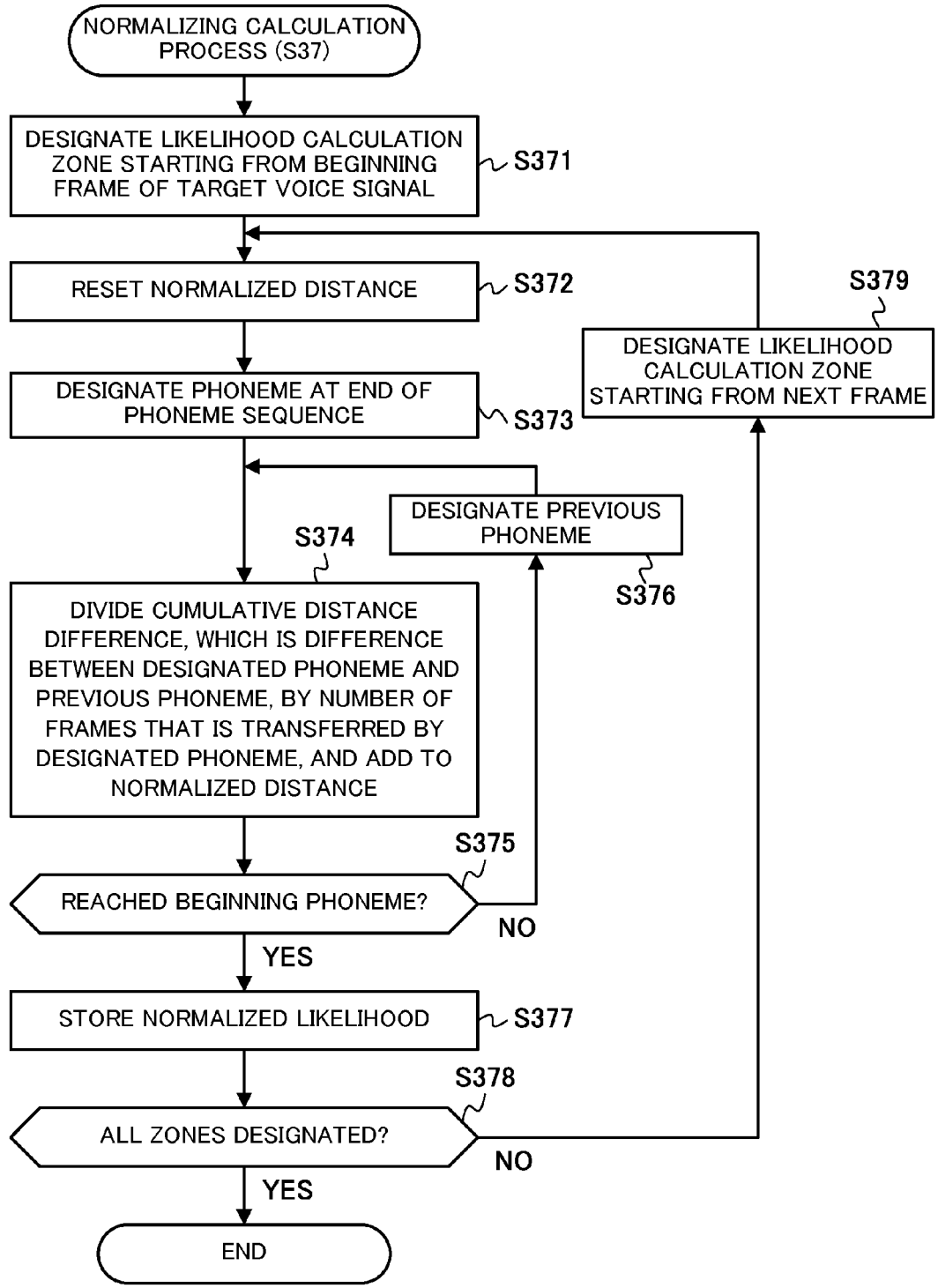

VOICE SEARCH DEVICE, VOICE SEARCH METHOD, AND NON-TRANSITORY RECORDING MEDIUM

CROSS-REFERENCE TO RELATED APPLICATION

This application claims the benefit of Japanese Patent Application No. 2014-42541, filed on Mar. 5, 2014, the entire disclosure of which is incorporated by reference herein.

FIELD

The present disclosure relates to a voice search device, a voice search method, and a non-transitory recording medium.

BACKGROUND

Recently, as multimedia content such as voice and video expands and prevails, accurate multimedia search technology is demanded. With regard to voice search, there is ongoing research about voice search technology that identifies a location where the voice corresponding to a given search word (query) is spoken. In voice search, because of characteristic issues such as the difficulty of voice recognition, a search technique with sufficient performance has not been established compared to string search that identifies a location that includes a desired search word within a string. For this reason, various technologies for realizing voice search of sufficient performance are being researched.

For example, Non-Patent Literature 1 (Keisuke Iwami, Nagisa Sakamoto, Seiichi Nakagawa, "Strict Distance Measure for a Spoken Term Detection Method Based on a Syllable n-gram Index with Distance Metric", IPSJ Journal, Vol. 54, No. 2, 495-505, (2013.2)) discloses a technique for voice search using a voice recognition result as a base that robustly search voice while taking into account problems such as unknown words and recognition errors.

SUMMARY

However, there are still various problems for realizing accurate voice search. For example, depending on the zone of the target voice signal, there may exist zones in which, for any search word, the voice corresponding to the search word is readily estimated as being spoken, such as long sounds and nearly silent signal zones, as well as zones where this is not the case. Such zones become a cause of misdetection. Also, depending on the search word, if only part of the search word is close to the target voice signal, it may be erroneously estimated from only the part that the entire search word corresponds to the voice signal.

The present disclosure has been devised to solve problems like the above, and takes as an objective thereof to provide a voice search device, a voice search method, and a non-transitory recording medium enabling accurate voice search.

In order to achieve the above objective, a voice search device according to the present disclosure comprises:

a search word acquirer acquiring a search word;

a converter converting the search word acquired by the search word acquirer into a phoneme sequence;

an output probability acquirer acquiring, for each frame, an output probability of a feature quantity of a target voice signal being output from each phoneme included in the phoneme sequence;

a relative calculator executing a relative calculation of the output probability acquired from each phoneme by the output probability acquirer, based on an output probability acquired from another phoneme included in the phoneme sequence;

a zone designator designating a plurality of likelihood acquisition zones in the target voice signal;

a likelihood acquirer acquiring a likelihood indicating how likely a likelihood acquisition zone designated by the zone designator is a zone in which voice corresponding to the search word is spoken, based on the output probability after the calculation by the relative calculator; and an identifier identifying from the target voice signal an estimated zone for which the voice corresponding to the search word is estimated to be spoken, based on the likelihood acquired by the likelihood acquirer from each likelihood acquisition zone designated by the zone designator.

According to the present disclosure, accurate voice search is possible.

BRIEF DESCRIPTION OF THE DRAWINGS

A more complete understanding of this application can be obtained when the following detailed description is considered in conjunction with the following drawings, in which:

FIG. 2 is a diagram illustrating a functional configuration of a voice search device according to Embodiment 1 of the present disclosure;

FIG. 3 is a diagram, wherein: (a) is a waveform diagram of a target voice signal, (b) is a diagram illustrating frames set in a target voice signal, and (c) is a diagram illustrating likelihood calculation zones designated in a target voice signal;

FIG. 4A is a diagram illustrating the distance in each frame for each phoneme

FIG. 4B is a diagram illustrating a base phoneme in each frame

FIG. 4C is a diagram illustrating distance relativized by the distances of base phonemes;

FIG. 9 is a diagram illustrating a maximum likelihood sequence search by DP matching, and a cumulative distance table as well as a transition direction table created during the search;

FIG. 11 is a flowchart illustrating the flow of a voice search process executed by a voice search device according to Embodiment 2 of the present disclosure; and FIG. 12 is a flowchart illustrating the flow of a normalizing calculation process according to Embodiment 2 of the present disclosure.

DETAILED DESCRIPTION

Figure 1:
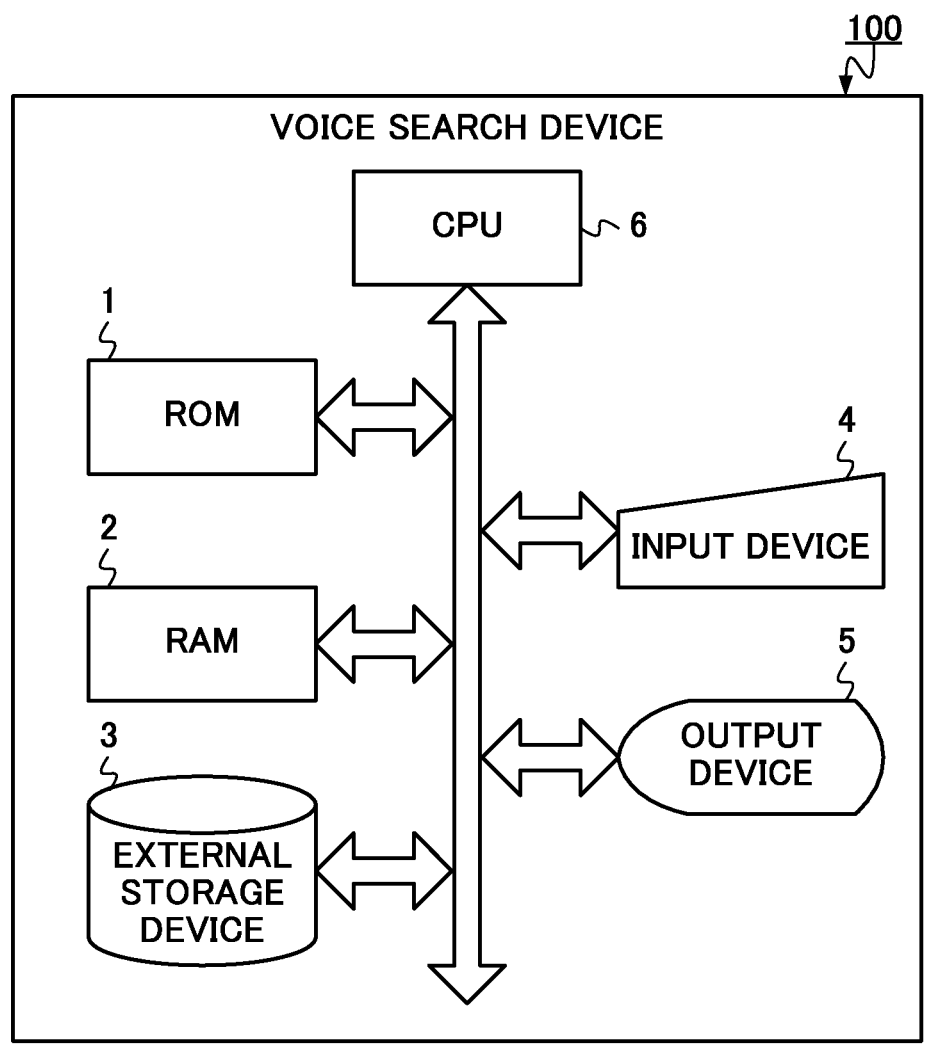
FIG. 1 is a diagram illustrating a physical configuration of a voice search device according to Embodiment 1 of the present disclosure.

Hereinafter, embodiments of the present disclosure will be described with reference to the drawings. Note that in the drawings, identical or corresponding parts are denoted with identical signs.

Embodiment 1

The voice search device according to Embodiment 1 is physically configured as illustrated in FIG. 1. The voice search device 100 includes read-only memory (ROM) 1, random access memory (RAM) 2, an external storage device 3, an input device 4, an output device 5, and a central processing unit (CPU) 6.

The ROM 1 stores an initial program for configuring various initial settings, conducting a hardware test, loading a program, and the like. The RAM 2 temporarily stores information such as various software programs executed by the CPU 6, and data required for the execution of these software programs.

The external storage device 3 is a hard disk or the like, for example, and stores information such as various software programs and data. These software programs include application software programs and a basic software program such as an operating system (OS).

The input device 4 is a keyboard or the like, for example. The input device 4 inputs, into the CPU 6, information such as text data input by the user operating the keyboard. The output device 5 is equipped with a screen such as a liquid crystal display and a speaker, for example. The output device 5 displays text data output by the CPU 6 onto the screen, and outputs audio or voice data from the speaker.

The CPU 6, by loading a software program stored in the external storage device 3 into the RAM 2, and controlling the execution of the software program, realizes the following functional configuration.

The voice search device 100 is functionally configured as illustrated in FIG. 2. The voice search device 100 includes voice signal storage 101, acoustic model storage 102, time length storage 104, a search word acquiring unit 111, a converting unit 112, a time length deriving unit 113, a zone designating unit 114, a feature quantity calculating unit 115, an output probability acquiring unit 116, a search unit 117, a likelihood calculating unit 118, a repeating unit 119, an identifying unit 120, and a relative calculating unit 130. The voice signal storage 101, the acoustic model storage 102, and the time length storage 104 are constructed as storage areas in the external storage device 3.

The voice signal storage 101 stores a target voice signal. The target voice signal may be a voice signal related to voice from a news broadcast or the like, voice from a recorded meeting, or voice from a movie or the like, for example.

The acoustic model storage 102 stores an acoustic model. The acoustic model models the frequency characteristics of respective phonemes that constitute strings acquirable as a search word. The acoustic model storage 102 stores an acoustic model based on monophones, that is, 1-sound phonemes (monophone model), an acoustic model based on biphones, that is, 2-sound phonemes (biphone model), or an acoustic model based on triphones, that is, 3-sound phonemes (triphone model).

A monophone model is an acoustic model generated per every one phoneme, and does not depend on adjacent phonemes. In other words, the monophone model is an acoustic model with fixed state transitions between the previous and next phoneme state. A biphone model and a triphone model are acoustic models generated per every two phonemes and every three phonemes, respectively, and are acoustic models that depend on adjacent phonemes. A biphone model is an acoustic model that takes into account the state transition between either the previous or the next phoneme state. A triphone model is an acoustic model that takes into account the state transitions between both the previous and the next phoneme state. Hereinafter, the case of using a monophone model as the acoustic model will be described as an example. The voice search device 100 learns an acoustic model with a typical method, and stores the learned acoustic model in the acoustic model storage 102 in advance.

A hidden Markov model (HMM), which is a typical acoustic model used for voice recognition, may be used as the acoustic model, for example. An HMM is a model for probabilistically estimating, from a voice signal, the original words output by the voice signal using a statistical technique. An HMM uses standard patterns that parameterize the transition probability, which indicates the temporal fluctuation of states, and the probability of outputting a feature quantity input from each state (output probability). The output probability is expressed by a Gaussian mixture distribution obtained by adding together Gaussian (normal) distributions weighted by predetermined weighting coefficients.

The time length storage 104 stores the average duration of each phoneme used by the acoustic model, in units of the states of each phoneme. The average duration of each phoneme is the average time length when each phoneme is spoken. The states of each phoneme are units that subdivide each phoneme in the time direction, and correspond to the minimum units of the acoustic model. Each phoneme has a predetermined number of states.

Hereinafter, the case in which "3" is the predetermined number of states for each phoneme will be described as an example. For example, the phoneme "a" is subdivided into the three states of a first state "a1" that includes the start of the phoneme when spoken, a second state "a2" which is an intermediate state, and a third state "a3" that includes the end of the phoneme when spoken. Provided that Q is the number of all phonemes used by the acoustic model, there exist (3×Q) states. For each of the (3×Q) states, the voice search device 100 calculates the average value of the duration from a large set of voice signal data, and stores the calculated average values in the time length storage 104 in advance.

Note that to improve search accuracy, the voice signals used to learn the acoustic model and the voice signal used to calculate the average durations of the phonemes are preferably spoken in the same domain (environment) as the domain in which the target voice signal is spoken. For example, if the target is a voice signal recorded in a conference room, it is preferable to learn the acoustic model and calculate the average durations of the phonemes using voice signals recorded in a conference room. However, the voice signals used to learn the acoustic model and the voice signal used to calculate the average durations of the phonemes may also be spoken in a domain that differs from the domain in which the target voice signal is spoken.

The search word acquiring unit 111 acquires a search word. The search word acquiring unit 111 acquires a search string input by the user via the input device 4 as the search word, for example. In other words, the user supplies the voice search device 100 with a text string (text) as the search word (query) to be used for searching the part of the target voice signal in which the desired voice is spoken.

The converting unit 112 sorts phonemes of the acoustic model in accordance with the search word acquired by the search word acquiring unit 111 to convert the search word into a phoneme sequence. In other words, the converting unit 112 converts the search word into a phoneme sequence by arranging the phonemes used when speaking each word in the same order as the words included in the search word.

For example, if the Japanese word "ramen" is input as the search word, since "ramen" includes the five phonemes (monophones) of "r", "a:", "m", "e", and "N", the converting unit 112 generates the phoneme sequence "r, a:, m, e, N". Alternatively, if the English word "cake" is input as the search word, since "cake" includes the four phonemes (monophones) of "k", "e", "i", and "k", the converting unit 112 generates the phoneme sequence "k, e, i, k".

The feature quantity calculating unit 115 acquires a target voice signal from the voice signal storage 101, and calculates a feature quantity of the target voice signal for each frame. The feature quantity is obtained by combining frequency-related feature parameters obtained by converting voice data on the frequency axis, called the cepstrum or Mel-frequency cepstrum, with power-related feature parameters obtained by calculating the sum of squares or the logarithm of the energy of the voice data, for example.

For example, the feature quantity is made up of a 38-dimensional vector quantity having a total of 38 components. The 38-dimensional vector quantity is made up of 12 components (12 dimensions) of frequency-related feature parameters, 1 component (1 dimension) of a power-related feature parameter, 12 components (12 dimensions) of delta frequency-related feature parameters, 1 component (1 dimension) of a delta power-related feature parameter, and 12 components (12 dimensions) of delta-delta frequency-related feature parameters. Note that the 12 components (12 dimensions) of delta frequency-related feature parameters are the result of taking the difference with respect to each component in the previous time window. Also, the 12 components (12 dimensions) of delta-delta frequency-related feature parameters are the result of taking the difference of the difference with respect to each component in the previous time window.

A frame is a time window having a predetermined time length in the voice signal. Frames set in a target voice signal will be described specifically with reference to FIGS. 3(*a*) to 3(*c*). FIG. 3(*a*) is a waveform diagram of a target voice signal of time length T from beginning to end. The vertical axis indicates the magnitude of the amplitude (energy) of the waveform, while the horizontal axis indicates the time t. FIG. 3(*b*) illustrates frames set in the voice signal illustrated in FIG. 3(*a*). N frames from the 0th frame to the (N−1)th frame, each of a frame length F, are set by shifting each frame by a predetermined shift length S.

The frame length F and the shift length S are matched to the time length set when creating the acoustic model (such as frame length F=25 ms and shift length S=10 ms, for example). Since the frame length F is longer than the shift length S, each frame overlaps with adjacent frames by a time length (F−S).

The output probability acquiring unit 116, on the basis of the feature quantity calculated by the feature quantity calculating unit 115, acquires for each frame an output probability of the feature quantity being output from each phoneme included in the phoneme sequence. In addition, the output probability acquiring unit 116 acquires for each frame an output probability of a feature quantity of the target voice signal being output from a silent phoneme.

Specifically, the output probability acquiring unit 116 acquires the acoustic model from the acoustic model storage 102, and compares the feature quantity in each frame calculated by the feature quantity calculating unit 115 to the acoustic model of each phoneme included in the phoneme sequence and a silent phoneme. Subsequently, the output probability acquiring unit 116 calculates the probability that the feature quantity in each frame will be output from each phoneme and the silent phoneme. This output probability is expressed as a normalized continuous mixture distribution obtained by the weighted addition of multiple Gaussian distributions.

After the output probability acquiring unit 116 acquires the output probability in each frame for each phoneme and the silent phoneme, the relative calculating unit 130 executes a relative calculation on the output probability of the feature quantity acquired for each frame by the output probability acquiring unit 116 being output from each phoneme included in the phoneme sequence, based on the output probability of the feature quantity being output from another phoneme included in the phoneme sequence. The relative calculating unit 130 includes a base phoneme selection unit 131 and a relative value calculating unit 132.

The relative calculation of the relative calculating unit 130 will be described with reference to FIGS. 4A to 4C. From the output probability acquired by the output probability acquiring unit 116, the relative calculating unit 130 calculates the distance from the feature quantity of the voice signal in each frame of each phoneme. As an example of the case in which the Japanese word "ramen" is input as the search word, FIG. 4A illustrates the distance in each frame for each phoneme in the phoneme sequence "r, a:, m:, e, N" converted by the converting unit 112 and the silent phoneme "sil".

Note that distance is an index that indicates the degree of difference between the acoustic model of each phoneme and the feature quantity of the voice signal in each frame. The distance is obtained by reversing the sign of the value obtained by taking the logarithm of the output probability. As the distance decreases in a certain frame for a certain phoneme, the probability of the feature quantity of the voice signal in that frame being output from that phoneme increases. In other words, a smaller distance indicates that the acoustic model of that phoneme and the feature quantity of the voice signal in that frame are close.

After calculating the distance in each frame for each phoneme, the base phoneme selection unit 131 selects a base phoneme from among the phonemes included in the phoneme sequence for each frame in the target voice signal. Specifically, for each frame in the target voice signal, the base phoneme selection unit 131 selects as the base phoneme the phoneme with the greatest output probability in the frame from among the phonemes included in the phoneme sequence and the silent phoneme, or in other words, the phoneme with the least distance.

FIG. 4B illustrates base phonemes selected from among the phonemes in the phoneme sequence "r, a:, m:, e, N" and the silent phoneme "sil".

In the 0th frame, the distance "0.1" of the phoneme "r" is the least among the distances of the respective phonemes. For this reason, the base phoneme selection unit 131 selects the phoneme "r" as the base phoneme in the 0th frame.

In the 1st frame, the distance "0.2" of the phoneme "m" is the least among the distances of the respective phonemes. For this reason, the base phoneme selection unit 131 selects the phoneme "m" as the base phoneme in the 1st frame.

In the 2nd frame, the distance "0.15" of the phoneme "r" is the least among the distances of the respective phonemes. For this reason, the base phoneme selection unit 131 selects the phoneme "r" as the base phoneme in the 2nd frame.

In the 3rd frame, the distance "0.1" of the silent phoneme "sil" is the least among the distances of the respective phonemes. For this reason, the base phoneme selection unit 131 selects the silent phoneme "sil" as the base phoneme in the 3rd frame.

After a base phoneme is selected for each frame in this way, the relative value calculating unit 132 calculates the relative value of the distance of each phoneme included in the phoneme sequence on the basis of the distance of the base phoneme for each frame in the target voice signal.

Specifically, as illustrated in FIG. 4C, for each frame, the relative value calculating unit 132 divides all distance values of the respective phonemes in that frame by the distance value of the base phoneme. As a result, the distance value of the base phoneme becomes 1, and the distance values of the other phonemes become values equal to or greater than 1. In this way, the relative value calculating unit 132 relativizes the distances of the phonemes within each frame so that the distance value of the base phoneme becomes 1 in all frames.

By relativizing the distances in this way, frames in which the distance is small (the output probability is large) for all phonemes and frames in which the distance is large (the output probability is small) for all phonemes become uniform. As a result, in the likelihood calculation discussed later, it is possible to minimize misdetection caused by the distance of some frames among the frames in a likelihood calculation zone becoming dominant.

The time length deriving unit 113 acquires, from the time length storage 104, the average duration of each phoneme included in the phoneme sequence converted by the converting unit 112. Subsequently, on the basis of the acquired average durations, the time length deriving unit 113 derives the spoken duration of the voice corresponding to the search word.

In other words, since the query is acquired as a text string, the voice search device 100 is unable to directly obtain information about the spoken time length of the voice corresponding to the query. For this reason, typical spoken durations for each state of the phonemes are prepared in the time length storage 104 in advance, and the voice search device 100 uses the durations for each state to estimate the spoken time length of the voice corresponding to the search word acquired by the search word acquiring unit 111.

For example, if the phoneme sequence is "r, a:, m, e, N", the time length deriving unit 113 acquires the average durations, stored in the time length storage 104, of three states for each of these five phonemes, for a total of 15 average durations. Subsequently, the time length obtained by summing the acquired 15 average durations is derived as the spoken time length of the voice corresponding to the search word.

The zone designating unit 114 acquires a target voice signal from the voice signal storage 101, and designates likelihood calculation zones, which are zones of the time length derived by the time length deriving unit 113, in order from the beginning of the target voice signal. Likelihood is an index that indicates the degree of similarity between the voice corresponding to the search word and the voice signal of the designated zone.

FIG. 3(c) illustrates likelihood calculation zones designated by the zone designating unit 114 in a target voice signal. First, the zone designating unit 114 designates the 0th likelihood calculation zone of time length L that includes M frames from the 0th frame to the (M−1)th frame.

The search unit 117, on the basis of the relative values calculated by the relative value calculating unit 132, uses dynamic programming (DP) matching to search for correspondences between each frame in the likelihood calculation zone designated by the zone designating unit 114 and each phoneme included in the phoneme sequence. In other words, assuming that the voice corresponding to the search word is spoken in a likelihood calculation zone designated by the zone designating unit 114, the search unit 117 searches for the phonemes that correspond to each frame within that likelihood calculation zone.

Figure 5:
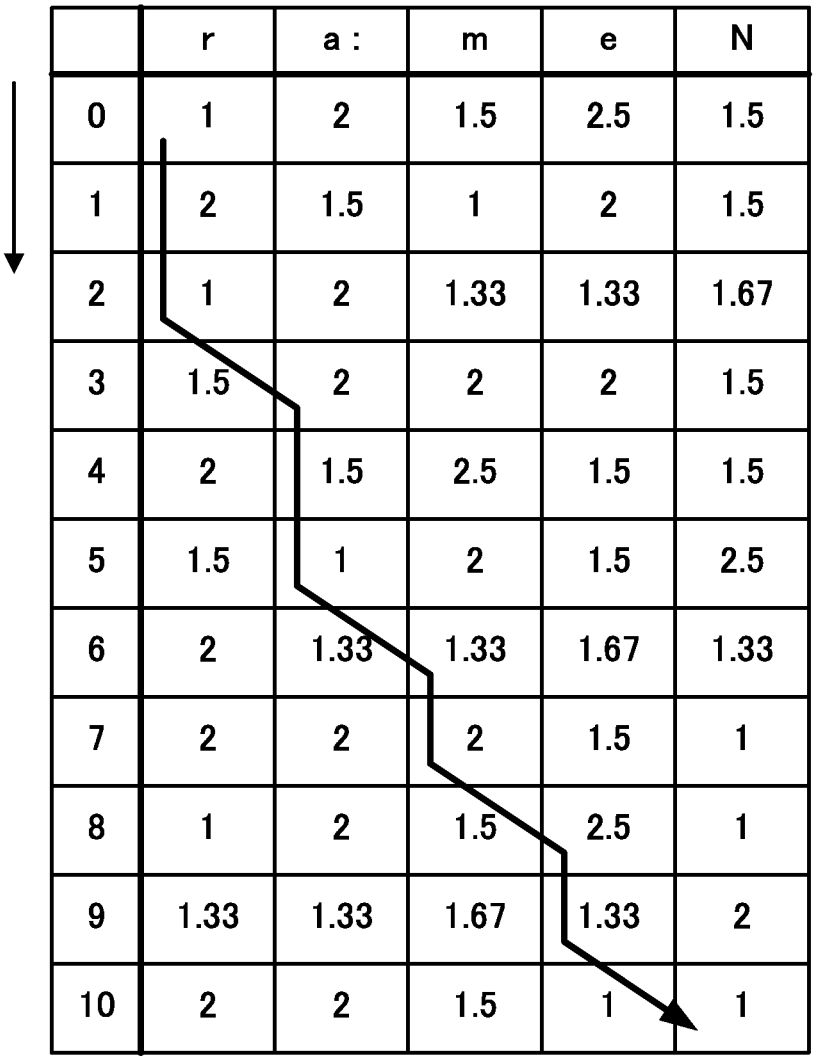
FIG. 5 is a diagram using a matrix of distance between feature quantity of a voice signal in each frame and each phoneme to illustrate a search for a maximum likelihood sequence by DP matching.

For example, FIG. 5 uses a distance matrix to illustrate a search for correspondences between each frame from the 0th frame to the 10th frame included in a likelihood calculation zone designated by the zone designating unit 114, and each phoneme of the phoneme sequence "r, a:, m, e, N". FIG. 5 uses an arrow to illustrate a path in the case of assuming that the 0th to 2nd frames correspond to the phoneme "r", the 3rd to 5th frames correspond to the phoneme "a:", the 6th and 7th frames correspond to the phoneme "m", the 8th and 9th frames correspond to the phoneme "e", and the 10th frame corresponds to the phoneme "N". Note that the numbers in the matrix cells indicate the relative value of the distance calculated for each frame and each phoneme by the relative value calculating unit 132.

In this way, the search unit 117 associates one of the phonemes included in the phoneme sequence with each frame from the beginning frame to the ending frame. Subsequently, the search unit 117 accumulates the relative values of the distance along the path obtained by association, and uses DP matching to search for a maximum likelihood sequence for which the cumulative value is minimized.

The likelihood calculating unit 118, on the basis of the relative value calculated by the relative value calculating unit 132 for each phoneme associated with each frame by the search of the search unit 117, calculates a likelihood that indicates how likely the likelihood calculation zone designated by the zone designating unit 114 is a zone in which the voice corresponding to the search word is spoken. Specifically, the likelihood calculating unit 118 acquires the likelihood of the likelihood calculation zone by performing computation that increases the likelihood for a smaller cumulative value of the relative values of the distance along the path of the maximum likelihood sequence obtained by the association of the search unit 117.

The repeating unit 119 changes the likelihood calculation zone designated by the zone designating unit 114, and repeats the processes of the zone designating unit 114, the search unit 117, and the likelihood calculating unit 118.

Described specifically with reference to FIG. 3(c), the repeating unit 119 shifts the likelihood calculation zone designated by the zone designating unit 114 by one frame, and newly designates the 1st likelihood calculation zone of time length L that includes M frames from the 1st frame to the Mth frame. Subsequently, in the newly designated 1st likelihood calculation zone, processes similar to the processes of the search unit 117 and the likelihood calculating unit 118 discussed above are executed, and the likelihood of the 1st likelihood calculation zone is calculated.

Similarly, the repeating unit 119 shifts the likelihood calculation zone designated by the zone designating unit 114 by one frame at a time from the 2nd likelihood calculation zone to the (P−1)th likelihood calculation zone, and the likelihood is calculated for each of the P likelihood calculation zones that are specifiable in the target voice signal. As a result, for every one frame of the target voice signal, the likelihood is calculated for the case of assuming that the voice corresponding to the search word is spoken in that zone. Note that the number P of likelihood calculation zones that are specifiable in the target voice signal is determined as P=(T−L+S)/S, using the time length T of the voice signal, the time length L of each likelihood calculation zone, and the shift length S.

The identifying unit 120, on the basis of the likelihood calculated by the likelihood calculating unit 118 for each likelihood calculation zone designated by the zone designating unit 114, identifies estimated zones from among the likelihood calculation zones designated by the zone designating unit 114 for which the voice corresponding to the search word is estimated to be spoken in the target voice signal. For example, the identifying unit 120 identifies a predetermined number of zones in order of largest likelihood calculated by the likelihood calculating unit 118 as the estimated zones. Position information about the zones identified by the identifying unit 120 is externally displayed via a screen provided in the output device 5 as the final search result.

A flow of a voice search process executed by the voice search device 100 as above will be described with reference to the flowchart illustrated in FIG. 6.

Figure 6:
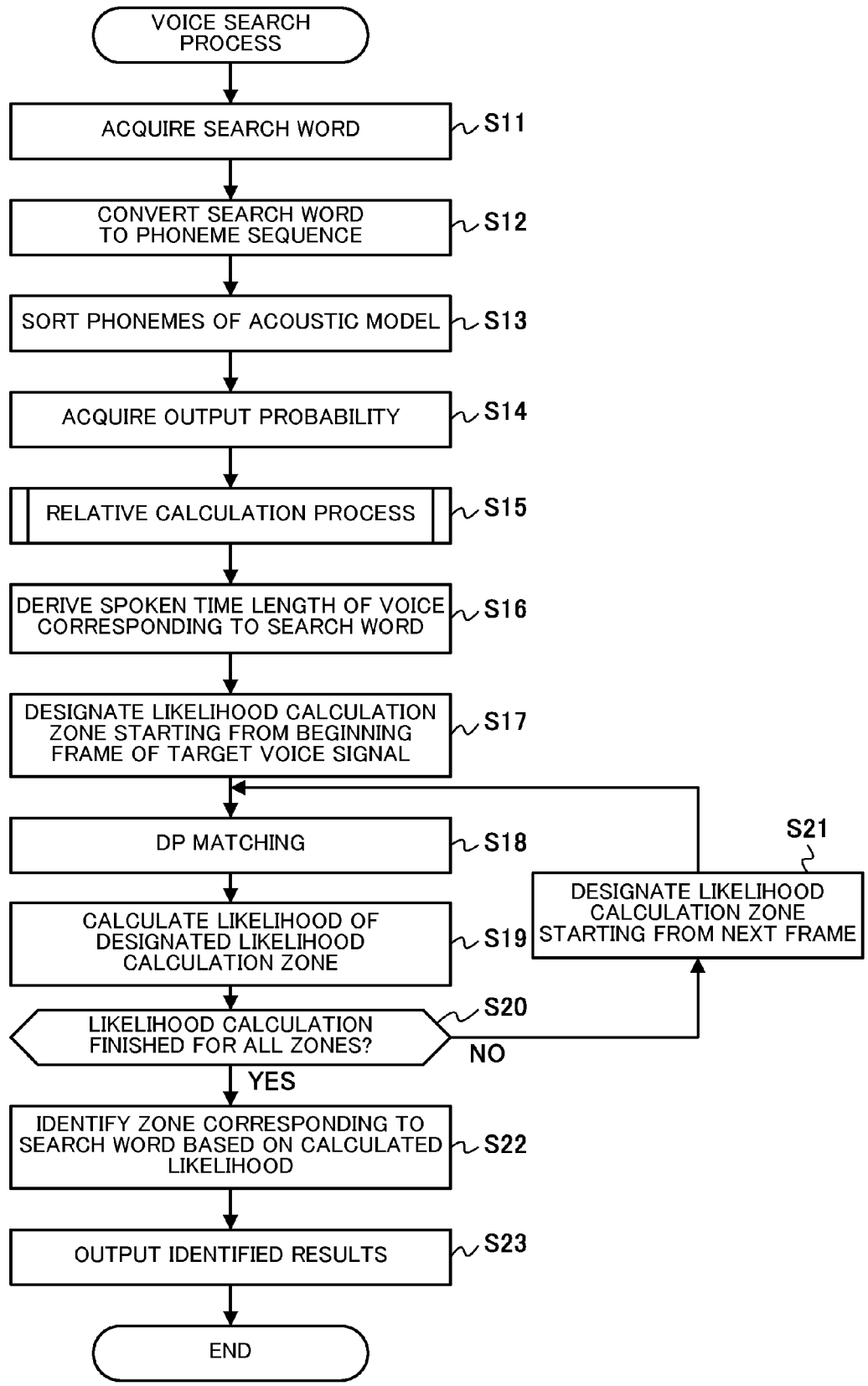
FIG. 6 is a flowchart illustrating the flow of a voice search process executed by a voice search device according to Embodiment 1 of the present disclosure.

The process of the flowchart illustrated in FIG. 6 starts when the search word acquiring unit 111 acquires a search word (step S11). After the search word acquiring unit 111 acquires a search word, the converting unit 112 converts the search word into a phoneme sequence (step S12), and sorts phonemes of the acoustic model in the phoneme order of the phoneme sequence (step S13). Specifically, the converting unit 112 converts a search word input as a text string into a monophone phoneme sequence or the like made up of monophones.

After the search word is converted into a phoneme sequence, the output probability acquiring unit 116, on the basis of feature quantity of the target voice signal and the acoustic model, acquires the output probability of the feature quantity in each frame being output from each phoneme in the phoneme sequence (step S14). Note that the feature quantity is calculated in advance by the feature quantity calculating unit 115. The feature quantity calculating unit 115 designates one frame at a time from the beginning to the end of the target voice signal, and successively calculates the feature quantity of the voice signal in the designated frame.

Figure 7:
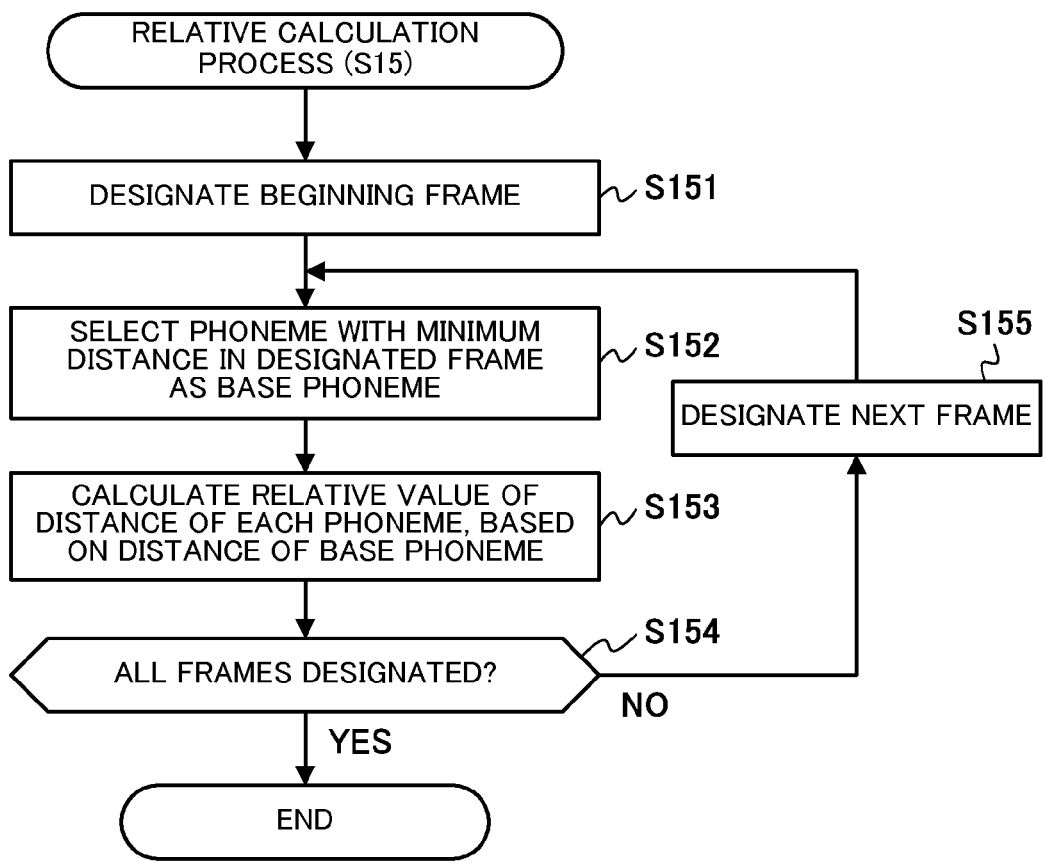
FIG. 7 is a flowchart illustrating the flow of a relative calculation process according to Embodiment 1 of the present disclosure.

After the output probability acquiring unit 116 acquires the output probabilities, the relative calculating unit 130 executes a relative calculation process on the acquired output probabilities (step S15). Details of the relative calculation process will be described with reference to the flowchart illustrated in FIG. 7.

The relative calculating unit 130 designates the frame at the beginning of the target voice signal (step S151). The base phoneme selection unit 131 selects the phoneme with the minimum distance within the designated frame as the base phoneme (step S152). The relative value calculating unit 132 calculates a relative value of distance of each phoneme in the designated frame, based on distance of base phoneme (step S153).

After the distances in the designated frame are relativized in this way, the relative calculating unit 130 determines whether or not all frames in the target voice signal have been designated (step S154). If not all frames have been designated (step S154; No), the relative calculating unit 130 designates the next frame (step S155), and the process returns to step S152. In other words, the relative calculating unit 130 executes the distance relative calculation process on the newly designated frame.

In this way, the relative calculating unit 130 repeats the distance relative calculation process for all frames, and calculates the relative values of the distances based on a base phoneme. Finally, after all frames have been designated (step S154; Yes), the relative calculation process illustrated in FIG. 7 ends.

Returning to the description of the flowchart illustrated in FIG. 6, after the relative calculation process ends, the time length deriving unit 113 derives the spoken time length of the voice corresponding to the search word (step S16). Specifically, the time length deriving unit 113 acquires the average duration stored for every phoneme state in the time length storage 104, and by summing the acquired average durations, derives the spoken time length of the voice corresponding to the search word.

After the time length deriving unit 113 derives the spoken time length, the voice search process successively designates likelihood calculation zones, which are zones of the derived spoken time length, from the beginning to the end of the target voice signal, and proceeds to the process of calculating likelihood. First, the zone designating unit 114 designates the likelihood calculation zone that starts from the beginning frame of the target voice signal (step S17).

After the zone designating unit 114 designates a likelihood calculation zone, the search unit 117, on the basis of the relative calculation results from the relative calculating unit 130, uses DP matching to search for correspondences between each frame in the designated likelihood calculation zone and each phoneme included in the phoneme sequence (step S18).

The likelihood calculating unit 118, on the basis of the relative value calculated by the relative value calculating unit 132 for each phoneme associated with each frame by the search of the search unit 117, calculates a likelihood that indicates how likely the likelihood calculation zone designated by the zone designating unit 114 is a zone in which the voice corresponding to the search word is spoken (step S19). After the likelihood calculating unit 118 calculates the likelihood, the repeating unit 119 determines whether or not the likelihood calculation is finished for all zones in the target voice signal (step S20).

If the likelihood calculation is not finished for all zones (step S20; No), the zone designating unit 114 designates a likelihood calculation zone starting from the next frame after the previously designated frame (step S21), and the voice search process returns to step S18. Subsequently, the repeating unit 119 repeats the processes in the above steps S18 to S20 on the newly designated likelihood calculation zone, and calculates the likelihood. In this way, the repeating unit 119 successively calculates likelihoods by shifting the likelihood calculation zone designated by the zone designating unit 114 one frame at a time until reaching the end of the target voice signal.

Finally, after the likelihood calculation finishes for all zones (step S20; Yes), the identifying unit 120 identifies zones corresponding to the search word on the basis of the calculated likelihoods (step S22). For example, the identifying unit 120 identifies a predetermined number of zones in order of largest likelihood calculated by the likelihood calculating unit 118 as the zones for which the voice corresponding to the search word is estimated to be spoken. Subsequently, the identifying unit 120 outputs the identified results via the output device 5 (step S23). As a result of the above, the voice search process executed by the voice search device 100 ends.

As described above, the voice search device 100 according to Embodiment 1 relativizes the distance of each phoneme based on the distance of a base phoneme in each frame in the target voice signal. Subsequently, on the basis of the relativized results, zones for which the voice corresponding to the search word is estimated to be spoken are identified from the target voice signal. As a result, it is possible to minimize misdetection caused by the existence of zones having a short distance to any phoneme, such as long sounds and nearly silent signal zones, as well as zones where this is not the case. Consequently, accurate voice search is possible.

Embodiment 2

Next, Embodiment 2 of the present disclosure will be described.

The voice search device according to Embodiment 2 is physically configured as illustrated in FIG. 1, similarly to the voice search device 100 according to Embodiment 1. For this reason, detailed description will be reduced or omitted herein.

Figure 8:
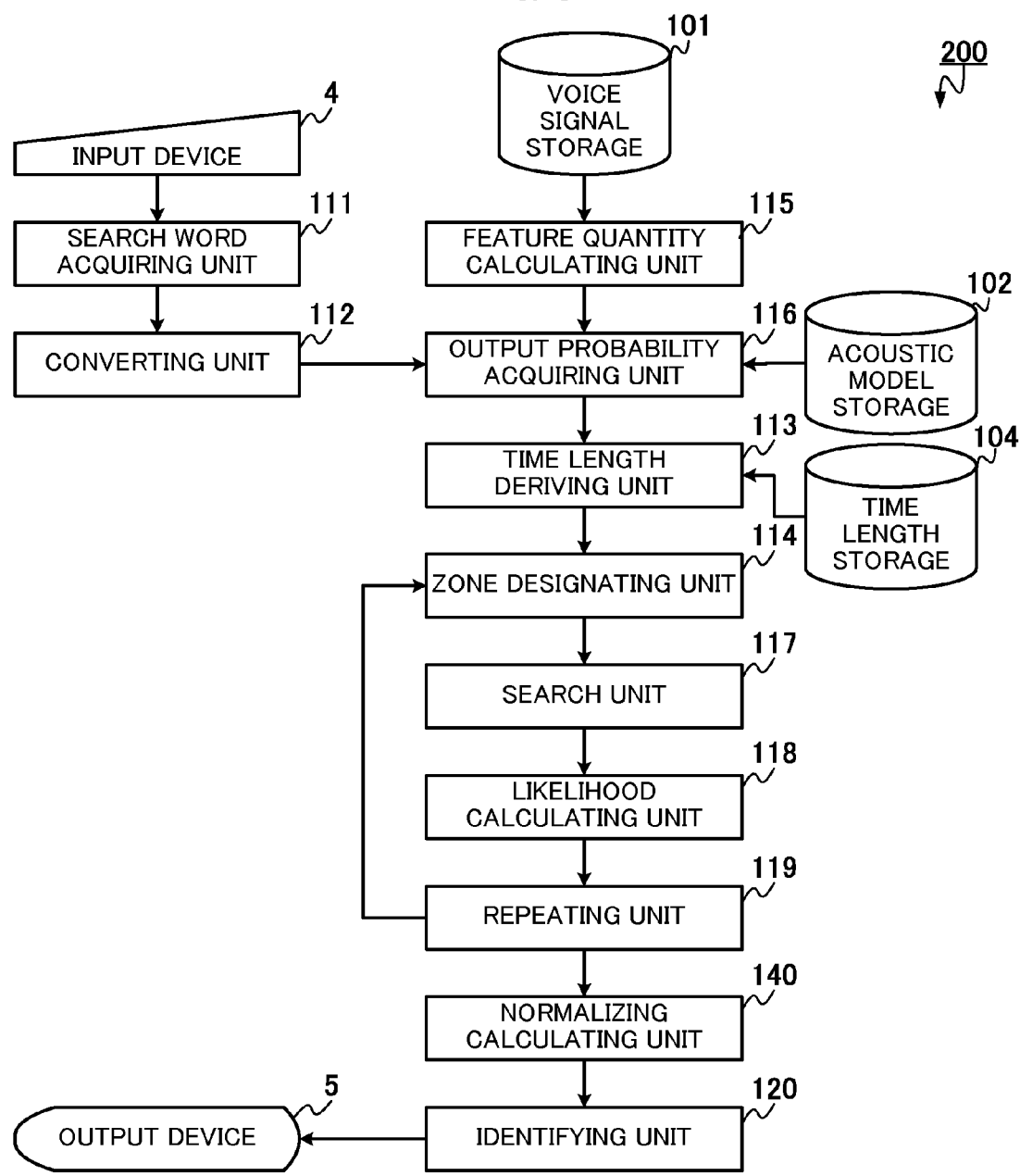
FIG. 8 is a diagram illustrating a functional configuration of a voice search device according to Embodiment 2 of the present disclosure.

The voice search device according to Embodiment 2 is functionally configured as illustrated in FIG. 8. The voice search device 200 is not equipped with the relative calculating unit 130 that was provided in the voice search device 100 according to Embodiment 1, and is instead equipped with a normalizing calculating unit 140. The other components basically function similarly to the components provided in the voice search device 100 according to Embodiment 1. For this reason, in the following, description of the functions shared in common with Embodiment 1 will be reduced or omitted as appropriate.

The voice signal storage 101 stores a target voice signal. The acoustic model storage 102 stores an acoustic model. The time length storage 104 stores the average duration of each phoneme used by the acoustic model, in units of the states of each phoneme.

The search word acquiring unit 111 acquires a search word. The converting unit 112 sorts phonemes of the acoustic model in accordance with the search word acquired by the search word acquiring unit 111 to convert the search word into a phoneme sequence.

The feature quantity calculating unit 115 acquires a target voice signal from the voice signal storage 101, and calculates a feature quantity of the target voice signal for each frame. The output probability acquiring unit 116, on the basis of the feature quantity calculated by the feature quantity calculating unit 115, acquires for each frame an output probability of the feature quantity being output from each phoneme included in the phoneme sequence.

The time length deriving unit 113 acquires, from the time length storage 104, the average duration of each phoneme included in the phoneme sequence converted by the converting unit 112. Subsequently, on the basis of the acquired average durations, the time length deriving unit 113 derives the spoken duration of the voice corresponding to the search word.

The zone designating unit 114 acquires a target voice signal from the voice signal storage 101, and designates likelihood calculation zones, which are zones of the time length derived by the time length deriving unit 113, in order from the beginning of the target voice signal. For example, as illustrated in FIG. 3(c), the zone designating unit 114 first designates the 0th likelihood calculation zone of time length L that includes M frames from the 0th frame to the (M−1)th frame. Likelihood is an index that indicates the degree of similarity between the voice corresponding to the search word and the voice signal of the designated zone.

The search unit 117, on the basis of the output probabilities acquired by the output probability acquiring unit 116, uses DP matching to search for correspondences between each frame in the likelihood calculation zone designated by the zone designating unit 114 and each phoneme included in the phoneme sequence. In other words, assuming that the voice corresponding to the search word is spoken in a likelihood calculation zone designated by the zone designating unit 114, the search unit 117 searches for the phonemes that correspond to each frame within that likelihood calculation zone.

For example, as illustrated in FIG. 9, the search unit 117 searches for correspondences between each frame from the 0th frame to the 10th frame included in a likelihood calculation zone designated by the zone designating unit 114, and each phoneme of the phoneme sequence "r, a:, m, e, N". FIG. 9 uses an arrow to illustrate a path in the case of assuming that the 0th to 2nd frames correspond to the phoneme "r", the 3rd to 5th frames correspond to the phoneme "a:", the 6th and 7th frames correspond to the phoneme "m", the 8th and 9th frames correspond to the phoneme "e", and the 10th frame corresponds to the phoneme "N". Note that the numbers in the matrix cells indicate the distance calculated from the output probability acquired for each frame and each phoneme by the output probability acquiring unit 116. For the sake of simplicity, only the numbers inside the cells along the path indicated by the arrow are illustrated.

In this way, the search unit 117 associates one of the phonemes included in the phoneme sequence with each frame from the beginning frame to the ending frame. Subsequently, the search unit 117 uses DP matching to search for a maximum likelihood sequence having the minimum cumulative distance accumulated along the path obtained by the association.

In addition, the search unit 117 creates a cumulative distance table recording the cumulative distances on the path of the maximum likelihood sequence obtained by the search using DP matching, and a transition direction table recording the transition directions. Examples of the cumulative distance table and the transition direction table are illustrated in the "Cumulative Distance" and "Transition Direction" columns in FIG. 9. The cumulative distance table includes information about the cumulative distance values from the 0th frame to the each frame along the path of the maximum likelihood sequence obtained by the search. The transition direction table includes information about the direction of the transition from each frame to the next frame along the path of the maximum likelihood sequence obtained by the search. Note that a down arrow indicates not moving to the next phoneme when transitioning from the current frame to the next frame. A right arrow indicates moving to the next phoneme when transitioning from the current frame to the next frame.

The likelihood calculating unit 118, on the basis of the output probabilities acquired by the output probability acquiring unit 116 for each phoneme associated with each frame by the search of the search unit 117, calculates a likelihood that indicates how likely the likelihood calculation zone designated by the zone designating unit 114 is a zone in which the voice corresponding to the search word is spoken. Specifically, the likelihood calculating unit 118 calculates the likelihood of the likelihood calculation zone by performing computation that increases the likelihood for a smaller cumulative distance on the path of the maximum likelihood sequence obtained by the association of the search unit 117.

The repeating unit 119 changes the likelihood calculation zone designated by the zone designating unit 114, and repeats the processes of the zone designating unit 114, the search unit 117, and the likelihood calculating unit 118.

Described specifically with reference to FIG. 3(c), the repeating unit 119 shifts the likelihood calculation zone designated by the zone designating unit 114 by one frame, and newly designates the 1st likelihood calculation zone of time length L that includes M frames from the 1st frame to the Mth frame. Subsequently, in the newly designated 1st likelihood calculation zone, processes similar to the processes of the search unit 117 and the likelihood calculating unit 118 discussed above are executed.

Similarly, the repeating unit 119 shifts the likelihood calculation zone designated by the zone designating unit 114 by one frame at a time from the 2nd likelihood calculation zone to the (P−1)th likelihood calculation zone, and executes processes similar to the processes of the search unit 117 and the likelihood calculating unit 118 for each of the P likelihood calculation zones that are specifiable in the target voice signal. As a result, for every one frame of the target voice signal, the repeating unit 119 creates a cumulative distance table and a transition direction table, and calculates the likelihood for the case of assuming that the voice corresponding to the search word is spoken in that zone.

After the search unit 117 creates the cumulative distance table and the transition direction table for each likelihood calculation zone in the target voice signal, the normalizing calculating unit 140 executes a normalizing calculation on the output probability acquired for each phoneme by the output probability acquiring unit 116, based on the number of frames associated with each phoneme by the search of the search unit 117.

Figure 10A:
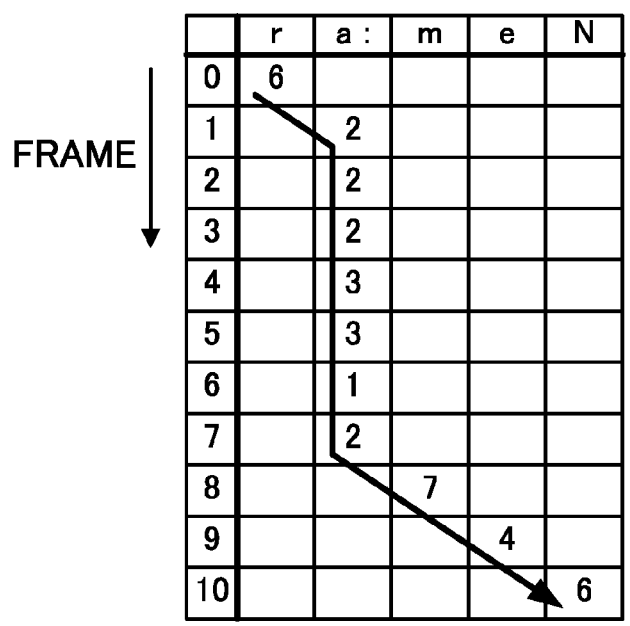
FIG. 10A is a diagram illustrating a path obtained by a maximum likelihood sequence search in zone that includes only a portion of the phonemes in a phoneme sequence corresponding to a search word, and the normalized cumulative distance.
Figure 10B:
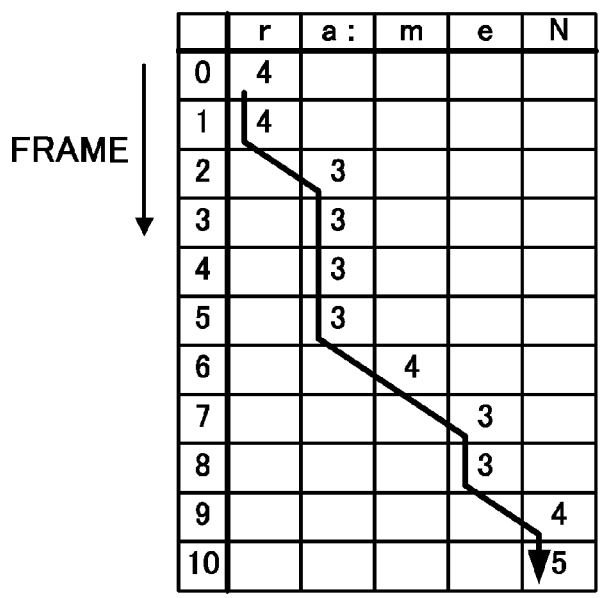
FIG. 10B is a diagram illustrating a maximum likelihood sequence search in a zone that includes all phonemes in a phoneme sequence corresponding to a search word, and the normalized cumulative distance.

The normalizing calculation of the normalizing calculating unit 140 will be described with reference to FIGS. 10A and 10B. FIG. 10A illustrates a path obtained by a maximum likelihood sequence search in a zone from among the likelihood calculation zones designated by the zone designating unit 114 that includes only the phoneme "a:" constituting part of the phoneme sequence "r, a:, m, e, N" corresponding to the search word "ramen". Meanwhile, FIG. 10B illustrates a path obtained by a maximum likelihood sequence search in a zone that includes all phonemes in the phoneme sequence "r, a:, m, e, N" corresponding to the search word "ramen".

In FIG. 10A, the cumulative distance normalized over the entire path is calculated as "3.45=(6+2+2+2+3+3+1+2+7+4+6)/11" by dividing the cumulative distance over the entire path by 11, the number of transitions. Similarly, in FIG. 10B, the cumulative distance normalized over the entire path is calculated as "3.54=(4+4+3+3+3+3+4+3+3+4+5)/11" by dividing the cumulative distance over the entire path by 11, the number of transitions.

In other words, the cumulative distance in the zone that includes only part of the phonemes in the phoneme sequence corresponding to the search word is less than the cumulative distance in the zone that includes all phonemes. This is because the path of the phoneme "a:" constituting part of the phoneme sequence occupies a long portion of the path overall (in FIG. 10A, from the 1st frame to the 7th frame). In this way, if a phoneme similar to only part of the phonemes in the phoneme sequence corresponding to the search word occupies a long path, the similarity is readily determined to be high for the entire phoneme sequence. For this reason, if voice search based on the cumulative distance normalized over the entire path is conducted, misdetection may occur.

To avoid the above issue, in a likelihood calculation zone designated by the zone designating unit 114, the normalizing calculating unit 140 calculates a normalized cumulative distance for each phoneme by normalizing the distances for each phoneme, that is, the values based on the output probabilities obtained for each phoneme associated with each frame by the search of the search unit 117, by the number of frames associated with that phoneme, and summing the normalized distances.

In FIG. 10A, since the phoneme "r" is associated with the 0th frame only, the normalizing calculating unit 140 divides the distance value "6" of this phoneme by the number of frames "1". Since the phoneme "a:" is associated with seven frames from the 1st frame to the 7th frame, the normalizing calculating unit 140 divides the cumulative distance of this phoneme by the number of frames "7". In this way, the normalizing calculating unit 140 divides the cumulative distance for each phoneme by the number of frames associated with each phoneme, or in other words, the number of transitions for each phoneme, up to the ending phoneme of the phoneme sequence, and obtains a cumulative distance "25.1=6/1+(2+2+2+3+3+1+2)/7+7/1+4/1+6/1" normalized for each phoneme.

Similarly, in FIG. 10B, the normalizing calculating unit 140 divides the cumulative distance for each phoneme by the number of transitions associated with each phoneme from the beginning phoneme to the ending phoneme of the phoneme sequence, and obtains a cumulative distance "18.5=(4+4)/2+(3+3+3+3)/4+4/1+(3+3)/2+(4+5)/2" normalized for each phoneme.

As a result of calculating the cumulative distance normalized for each phoneme, the weighting of each phoneme becomes uniform, and thus the cumulative distance in the zone that includes only part of the phonemes in the phoneme sequence corresponding to the search word becomes greater than the cumulative distance in the zone that includes all phonemes. For this reason, misdetection is minimized, enabling accurate voice search.

The normalizing calculating unit 140 calculates the cumulative distance normalized for each phoneme in this way for each likelihood calculation zone designated by the zone designating unit 114. Subsequently, computation is performed so that the likelihood increases as the cumulative distance normalized for each phoneme decreases, and a normalized likelihood that normalizes the likelihood of the likelihood calculation zone is calculated.

The identifying unit 120, on the basis of the normalized likelihood calculated by the normalizing calculating unit 140, identifies estimated zones from among the likelihood calculation zones designated by the zone designating unit 114 for which the voice corresponding to the search word is estimated to be spoken in the target voice signal. For example, the identifying unit 120 identifies a predetermined number of zones in order of largest normalized likelihood calculated by the normalizing calculating unit 140 as the estimated zones. Position information about the zones identified by the identifying unit 120 is externally displayed via a screen provided in the output device 5 as the final search result.

A flow of a voice search process executed by the voice search device 200 as above will be described with reference to the flowchart illustrated in FIG. 11.

The process of the flowchart illustrated in FIG. 11 starts when the search word acquiring unit 111 acquires a search word (step S31). After the search word acquiring unit 111 acquires a search word, the converting unit 112 converts the search word into a phoneme sequence (step S32), and sorts phonemes of the acoustic model in the phoneme order of the phoneme sequence (step S33). Specifically, the converting unit 112 converts a search word input as a text string into a monophone phoneme sequence or the like made up of monophones.

After the search word is converted into a phoneme sequence, the output probability acquiring unit 116, on the basis of feature quantity of the target voice signal and the acoustic model, acquires the output probability of the feature quantity in each frame being output from each phoneme in the phoneme sequence (step S34). Note that the feature quantity is calculated in advance by the feature quantity calculating unit 115. The feature quantity calculating unit 115 designates one frame at a time from the beginning to the end of the target voice signal, and successively calculates the feature quantity of the voice signal in the designated frame.

After the output probability acquiring unit 116 acquires the output probabilities, the time length deriving unit 113 derives the spoken time length of the voice corresponding to the search word (step S35). Specifically, the time length deriving unit 113 acquires the average duration stored for every phoneme state in the time length storage 104, and by summing the acquired average durations, derives the spoken time length of the voice corresponding to the search word.

After the time length deriving unit 113 derives the spoken time length, the zone designating unit 114 successively designates likelihood calculation zones, which are zones of the derived spoken time length, from the beginning to the end of the target voice signal. Subsequently, the search unit 117 uses DP matching to search for correspondences between each frame in the designated likelihood calculation zone and each phoneme included in the phoneme sequence, and creates a cumulative distance table and a transition direction table (step S36).

After the search unit 117 creates a cumulative distance table and a transition direction table for each likelihood calculation zone designated by the zone designating unit 114, the normalizing calculating unit 140 executes a normalizing calculation process (step S37). Details of the normalizing calculation process will be described with reference to the flowchart illustrated in FIG. 12.

In the normalizing calculation process, first, the normalizing calculating unit 140 designates the likelihood calculation zone starting from the beginning frame of the target voice signal (step S371). This likelihood calculation zone is the same as the zone designated by the zone designating unit 114 for the search unit 117 to create the cumulative distance table and the transition direction table. The normalizing calculating unit 140 designates the likelihood calculation zones designated by the zone designating unit 114 again in order from the beginning.

After designating a likelihood calculation zone, the normalizing calculating unit 140 resets the cumulative distance normalized in the designated likelihood calculation zone (hereinafter designated the "normalized distance") (step S372). Subsequently, the normalizing calculating unit 140 designates the phoneme at the end of the phoneme sequence converted from the search word by the converting unit 112 (step S373), divides cumulative distance difference, which is difference between designated phoneme and previous phoneme, by number of frames that is transferred by designated phoneme, and adds to normalized distance (step S374).

Specifically, the description will refer to the example of FIG. 9. On the path illustrated in FIG. 9, the two frames of the 9th and 10th frames transition to the end phoneme "N" of the phoneme sequence "r, a:, m, e, N", and transition from the previous phoneme "e" from the 8th frame to the 9th frame. The normalizing calculating unit 140 obtains such transition information by referencing the transition direction table for the designated likelihood calculation zone. On the basis of this information, the normalizing calculating unit 140 ascertains that the number of frames that transition to the end phoneme "N" is "2".

In addition, by referencing the cumulative distance table, the normalizing calculating unit 140 ascertains that the cumulative distance is up to the 10th frame (that is, the end frame) is "47", and that the cumulative distance up to the 8th frame (that is, the last frame for the previous phoneme "e") is "35". On the basis of this information, the normalizing calculating unit 140 ascertains that the cumulative distance difference since transitioning to the end phoneme "N" from the previous phoneme "e" is "12=47−35". Subsequently, the normalizing calculating unit 140 adds the value "6", which is obtained by dividing the cumulative distance difference "12" for the end phoneme "N" by the number of transitioned frames "2", to the reset normalized distance.

After the addition process for the designated phoneme ends, the normalizing calculating unit 140 determines whether or not the designated phoneme has reached the phoneme at the beginning of the phoneme sequence (step S375). If the designated phoneme has not reached the beginning phoneme (step S375; No), the normalizing calculating unit 140 designates the previous phoneme (step S376), and returns the process to step S374. In other words, the normalizing calculating unit 140 successively designates each phoneme from the end phoneme to the beginning phoneme of the phoneme sequence, and repeats a process of dividing the cumulative distance difference by the number of frames that transition to the designated phoneme, and adding the obtained value to the normalized distance.

If the designated phoneme has reached the beginning phoneme (step S375; Yes), the normalizing calculating unit 140 calculates the normalized likelihood from the obtained normalized distance, and stores the calculated normalized likelihood in a storage area of the RAM 2 or the like together with the beginning frame and the ending frame of the zone (step S377).

Note that the normalizing calculating unit 140 may also compare the calculated normalized likelihood to the likelihood before normalization, and if the likelihood before normalization is greater than the normalized likelihood, treat the likelihood before normalization as the likelihood of the designated likelihood calculation zone.

After the normalization of the likelihood ends for the designated likelihood calculation zone in this way, the normalizing calculating unit 140 determines whether or not all likelihood calculation zones in the target voice signal have been designated (step S378). If not all likelihood calculation zones have been designated (step S378; No), the normalizing calculating unit 140 designates a likelihood calculation zone starting from the next frame (step S379), and returns the process to step S372. In other words, the normalizing calculating unit 140 executes the likelihood normalization computation process on the newly designated likelihood calculation zone.

In this way, the normalizing calculating unit 140 repeats the normalizing calculation process and calculates a normalized likelihood for all likelihood calculation zones of the target voice signal. Finally, after all likelihood calculation zones have been designated (step S378; Yes), the normalizing calculation process illustrated in FIG. 12 ends.

Returning to the description of the flowchart illustrated in FIG. 11, after the likelihoods of all zones are normalized, the identifying unit 120 identifies zones corresponding to the search word based on the normalized likelihoods (step S38). For example, the identifying unit 120 identifies a predetermined number of zones in order of largest normalized likelihood as the zones for which the voice corresponding to the search word is estimated to be spoken. Subsequently, the identifying unit 120 outputs the identified results via the output device 5 (step S39). As a result of the above, the voice search process executed by the voice search device 200 ends.

As described above, in voice search using DP matching, the voice search device 200 according to Embodiment 2 calculates a cumulative distance of a path obtained by DP matching that is normalized to each phoneme. Subsequently, on the basis of the normalized results, zones for which the voice corresponding to the search word is estimated to be spoken are identified from the target voice signal. As a result, it is possible to minimize misdetection in which a zone similar to only some of the phonemes constituting the phoneme sequence corresponding to the search word is retrieved with higher ranking than a zone that includes all of the phonemes. Consequently, accurate voice search is possible.

Modifications

The foregoing thus describes embodiments of the present disclosure, but the above embodiments are merely examples, and the applicability of the present disclosure is not limited thereto. In other words, embodiments of the present disclosure may be applied in various ways, and all such embodiments are included in the scope of the present disclosure.

For example, in Embodiments 1 and 2, the search word acquiring unit 111 acquires the search word (query) as a text string (text). However, in the present disclosure, the search word acquiring unit 111 may also acquire the search word as voice. In this case, the input device 4 is equipped with a microphone, for example. Additionally, the search word acquiring unit 111 acquires voice spoken by a user via the microphone, executes a voice recognition process on the acquired voice data, and converts the voice data into text data. The voice search device 100 executes a voice search process similar to the above on this text data.

Also, in Embodiment 1, the base phoneme selection unit 131 selects the phoneme with the minimum distance in each frame as the base phoneme. However, in the present disclosure, the base phoneme selection unit 131 may also select the base phoneme according to other criteria, such as selecting the phoneme with the maximum distance, or in other words the minimum output probability, as the base phoneme.

Also, in Embodiment 1, the relative calculating unit 130 executes the relative calculation by selecting a base phoneme from among the phonemes included in the search word acquired by the search word acquiring unit 111, and a silent phoneme. However, in the present disclosure, the relative calculating unit 130 may also execute the relative calculation by selecting a base phoneme from output probabilities or distances calculated for all phonemes included in the acoustic model, or all monophone phonemes.

Also, in Embodiment 1, the relative value calculating unit 132 calculates the relative value of the distance of each phoneme included in the phoneme sequence on the basis of the distance of the base phoneme for each frame in the target voice signal. However, in the present disclosure, the relative value calculating unit 132 is not limited to calculating the relative value of the distance with respect to the base phoneme, and may also calculate the relative value of the output probability itself, or calculate a relative value of some other value based on the output probability to thereby make the weighting of an index for the identifying unit 120 to identify zones corresponding to the search word uniform among frames.

Also, in Embodiment 2, the normalizing calculating unit 140 calculates a cumulative distance normalized to each phoneme for each likelihood calculation zone, and calculates a normalized likelihood on the basis of the normalized distance. However, in the present disclosure, the target of normalization is not limited to distance. For example, the normalizing calculating unit 140 may also normalize the output probability itself to each phoneme, and calculate the normalized likelihood by taking a sum along the logarithmic axis of normalized output probabilities.

Also, a voice search device according to the present disclosure may be equipped with both of the relative calculating unit 130 provided in the voice search device 100 according to Embodiment 1, and the normalizing calculating unit 140 provided in the voice search device 200 according to Embodiment 2. In this case, the normalizing calculating unit 140 executes the normalizing calculation detailed in Embodiment 2 on the output probabilities computed by the relative calculating unit 130 detailed in Embodiment 1. Described specifically, in a likelihood calculation zone designated by the zone designating unit 114, the normalizing calculating unit 140 calculates a normalized likelihood by taking the values based on the output probability computed by the relative calculating unit 130 for each phoneme associated with each frame by the search of the search unit 117, normalizing the values by the number of frames associated with the relevant phoneme, and summing the normalized values. As a result, a voice search device according to the present disclosure is able to obtain both the advantageous effects of the relative calculating unit 130 and the advantageous effects of the normalizing calculating unit 140, thereby enabling even more accurate voice search.

Note that a configuration for realizing functionality according to the present disclosure may be provided as a voice search device with the functionality already built in, or by implementing a program to cause a device such as an existing personal computer or information terminal to function as a voice search device according to the present disclosure. In other words, by implementing a program for realizing the functional configurations of the voice search devices 100 and 200 exemplified in the foregoing embodiments so that the program is executable by a CPU or the like that controls a device such as an existing personal computer or information terminal, the device may be made to function as a voice search device according to the present disclosure. In addition, a voice search method according to the present disclosure may be performed using a voice search device.

Furthermore, the method of implementing such a program is arbitrary. The program may be implemented by being stored on a non-transitory computer-readable recording medium (such as a Compact Disc-Read-Only Memory (CD-ROM), a Digital Versatile Disc (DVD), or a magneto-optical (MO) disc), for example. Additionally, the program may also be implemented by being stored in storage on a network such as the Internet and downloaded.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A voice search device comprising:
a processor; and
a memory storing instructions that, when executed by the processor, control the processor to:
convert a search word into a phoneme sequence;
acquire, for each of frames in a target voice signal, a plurality of relative values between (i) a base phoneme selected for the frame from among a plurality of base phonemes each of which is selected for a respective different one of the frames in the target voice signal, and (ii) phonemes included in the phoneme sequence, wherein each of the frames has a time length;
designate a plurality of zones in the target voice signal, each of the zones having a time length;
acquire, using the plurality of relative values, a plurality of likelihoods each indicating how likely a respective zone from among the plurality of zones is a zone in which voice corresponding to the search word is spoken; and
specify a zone corresponding to the search word from among the plurality of zones, based on the plurality of likelihoods.

2. The voice search device according to claim 1, wherein the instructions, when executed by the processor, further control the processor to:
acquire, for each frame, an output probability of a feature quantity of the target voice signal being output from each phoneme included in the phoneme sequence; and
wherein, for each frame in the target voice signal, the relative values are calculated based on (i) value based on the output probability in each frame obtained from each phoneme included in the phoneme sequence and (ii) a value based on the output probability in each frame obtained from the base phoneme.

3. The voice search device according to claim 2, wherein the instructions, when executed by the processor, further control the processor to:
acquire, for each frame, an output probability of a feature quantity of the target voice signal being output from a silent phoneme, and
wherein each of the selected base phonemes is a phoneme with a maximum output probability in each frame from among the phonemes included in the phoneme sequence and the silent phoneme.

4. The voice search device according to claim 1, wherein the instructions, when executed by the processor, further control the processor to:
search, based on the plurality of relative values, a correspondence between each frame in a respective one of the plurality of zones and each phoneme included in the phoneme sequence by dynamic programming; and
wherein the plurality of likelihoods are acquired based on a result of the search.

5. The voice search device according to claim 4, wherein the instructions, when executed by the processor, further control the processor to:
execute a normalizing calculation, based on a number of frames corresponded with each phoneme, to each of the plurality of likelihoods, thereby calculating a normalized likelihood that normalizes each of the plurality of likelihoods; and
wherein the zone is specified based on the normalized likelihood.

6. The voice search device according to claim 5, wherein the normalized likelihood is calculated by taking the relative values, normalizing each relative value using the number of frames corresponded with each phoneme, and summing normalized values.

7. The voice search device according to claim 1, wherein the instructions, when executed by the processor, further control the processor to:
select the plurality of base phonemes, the base phonemes being selected from among the phonemes included in the phoneme sequence.

8. A voice search method comprising:
converting a search word into a phoneme sequence;
acquiring, for each of frames in a target voice signal, a plurality of relative values between (i) a base phoneme selected for the frame from among a plurality of base phonemes each of which is selected for a respective different one of the frames in the target voice signal, and (ii) phonemes included in the phoneme sequence, wherein each of the frames has a time length;
designating a plurality of zones in the target voice signal, each of the zones having a time length;
acquiring, using the plurality of relative values, a plurality of likelihoods each indicating how likely a respective zone from among the plurality of zones is a zone in which voice corresponding to the search word is spoken; and
specifying a zone corresponding to the search word from among the plurality of zones, based on the plurality of likelihoods.

9. The voice search method according to claim 8, further comprising:
acquiring, for each frame, an output probability of a feature quantity of the target voice signal being output from each phoneme included in the phoneme sequence,
wherein, for each frame in the target voice signal, the relative values are calculated based on (i) a value based on the output probability in each frame obtained from each phoneme included in the phoneme sequence and (ii) a value based on the output probability in each frame obtained from the base phoneme.

10. The voice search method according to claim 9, further comprising:
acquiring, for each frame, an output probability of a feature quantity of the target voice signal being output from a silent phoneme,
wherein each of the selected base phonemes is a phoneme with a maximum output probability in each frame from among the phonemes included in the phoneme sequence and the silent phoneme.

11. The voice search method according to claim 8, further comprising:
searching, based on the plurality of relative values, a correspondence between each frame in a respective one of the plurality of zones and each phoneme included in the phoneme sequence by dynamic programming,
wherein the plurality of likelihoods are acquired based on a result of the searching.

12. The voice search method according to claim 11, further comprising:
executing a normalizing calculation, based on a number of frames corresponded with each phoneme, to each of the plurality of likelihoods, thereby calculating a normalized likelihood that normalizes each of the plurality of likelihoods;
wherein the zone is specified based on the normalized likelihood.

13. The voice search method according to claim 12, wherein the normalized likelihood is calculated by taking the relative values, normalizing each relative value using the number of frames corresponded with each phoneme, and summing normalized values.

14. The voice search method according to claim 8, further comprising:
selecting the plurality of base phonemes, the base phonemes being selected from among the phonemes included in the phoneme sequence.

15. A non-transitory recording medium having a program recorded thereon that is executable to control a computer to:
convert a search word into a phoneme sequence;
acquire, for each of frames in a target voice signal, a plurality of relative values between (i) a base phoneme selected for the frame from among a plurality of base phonemes each of which is selected for a respective different one of the frames in the target voice signal, and (ii) phonemes included in the phoneme sequence, wherein each of the frames has a time length;
designate a plurality of zones in the target voice signal, each of the zones having a time length;
acquire, using the plurality of relative values, a plurality of likelihoods each indicating how likely a respective zone from among the plurality of zones is a zone in which voice corresponding to the search word is spoken; and
specify a zone corresponding to the search word from among the plurality of zones, based on the plurality of likelihoods.

16. The non-transitory recording medium according to claim 15, wherein the program is executable to further control the processor to:
acquire, for each frame, an output probability of a feature quantity of the target voice signal being output from each phoneme included in the phoneme sequence; and
wherein, for each frame in the target voice signal, the relative values are calculated based on (i) a value based on the output probability in each frame obtained from each phoneme included in the phoneme sequence and (ii) a value based on the output probability in each frame obtained from the base phoneme.

17. The non-transitory recording medium according to claim 16, wherein the program is executable to further control the processor to:
acquire, for each frame, an output probability of a feature quantity of the target voice signal being output from a silent phoneme, and
wherein each of the selected base that phonemes is a phoneme with a maximum output probability in each frame from among the phonemes included in the phoneme sequence and the silent phoneme.

18. The non-transitory recording medium according to claim 15, wherein the program is executable to further control the processor to:
search, based on the plurality of relative values, a correspondence between each frame in a respective one of the plurality of zones and each phoneme included in the phoneme sequence by dynamic programming; and
wherein the plurality of likelihoods are acquired based on a result of the search.

19. The non-transitory recording medium according to claim 18, wherein the program is executable to further control the processor to:
execute a normalizing calculation, based on a number of frames corresponded with each phoneme, to each of the plurality of likelihoods, thereby calculating a normalized likelihood that normalizes each of the plurality of likelihoods;
wherein the zone is specified based on the normalized likelihood.

20. The non-transitory recording medium according to claim 19, wherein the normalized likelihood is calculated by taking the relative values, normalizing each relative value using the number of frames corresponded with each phoneme, and summing normalized values.

21. The non-transitory recording medium according to claim 15, wherein the program is executable to further control the processor to:
select the plurality of base phonemes, the base phonemes being selected from among the phonemes included in the phoneme sequence.

* * * * *